United States Patent
McCusker

(10) Patent No.: US 7,619,556 B1
(45) Date of Patent: Nov. 17, 2009

(54) SYSTEM AND METHOD FOR SYNTHESIZING LOCALIZER AND GLIDE SLOPE DEVIATIONS FROM WEATHER RADAR

(75) Inventor: Patrick Dennis McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 128 days.

(21) Appl. No.: 12/072,741

(22) Filed: Feb. 28, 2008

(51) Int. Cl.
*G01S 13/06* (2006.01)

(52) U.S. Cl. .......................... 342/33; 342/26 B; 342/34; 342/35; 342/140; 342/141; 342/142; 342/179; 342/53

(58) Field of Classification Search ............... 342/26 R, 342/26 B, 33–36, 107, 113, 133, 139–142, 342/146, 147, 179, 53
See application file for complete search history.

(56) References Cited

U.S. PATENT DOCUMENTS

| | | | | |
|---|---|---|---|---|
| 4,680,587 A * | 7/1987 | Chisholm | .................... | 342/33 |
| 6,317,663 B1 * | 11/2001 | Meunier et al. | ............... | 701/16 |
| 6,347,263 B1 * | 2/2002 | Johnson et al. | ............... | 701/14 |
| 6,456,940 B1 * | 9/2002 | Higgins | ...................... | 701/301 |
| 6,977,608 B1 * | 12/2005 | Anderson et al. | ......... | 342/26 B |
| 7,440,591 B1 * | 10/2008 | McCusker | ................... | 382/109 |
| 7,570,177 B2 * | 8/2009 | Reynolds et al. | ............ | 340/961 |
| 2006/0097895 A1 * | 5/2006 | Reynolds et al. | ............ | 340/961 |
| 2006/0290531 A1 * | 12/2006 | Reynolds et al. | ............ | 340/961 |

* cited by examiner

*Primary Examiner*—John B Sotomayor
(74) *Attorney, Agent, or Firm*—Daniel M. Barbieri

(57) ABSTRACT

The present invention is a method for obtaining a localizer deviation and a glide slope deviation for an aircraft. The method may include directing electromagnetic signals from a weather radar system of an aircraft towards a runway. The method may further include receiving return signals in response to the directed signals. The method may further include, based on the received return signals, determining an azimuth angle for the aircraft relative to the runway, determining an elevation angle for the aircraft relative to the runway, and determining a range for the aircraft relative to the runway. The method may further include based on the azimuth angle, the elevation angle, and the range, calculating the localizer deviation and the glide slope deviation for the aircraft.

22 Claims, 2 Drawing Sheets

US 7,619,556 B1

SYSTEM AND METHOD FOR SYNTHESIZING LOCALIZER AND GLIDE SLOPE DEVIATIONS FROM WEATHER RADAR

FIELD OF THE INVENTION

The present invention relates to the field of aircraft navigational instrumentation and particularly to a system and method for synthesizing localizer and glide slope deviations from on-board weather radar.

BACKGROUND OF THE INVENTION

A number of airports are equipped with ground-based instrument approach systems known as Instrument Landing Systems (ILS) for providing precision guidance to aircraft which may be approaching the runways of said airports. However, the ground infrastructure of an Instrument Landing System (ILS) is often very expensive. Such expense may limit the number of airports which may be equipped with an ILS. Airports without an ILS may not be able to support low visibility operations. Currently available alternatives to implementing an ILS may not be as accurate or reliable as desired.

Thus, it would be desirable to provide a system or method for providing precision guidance to an aircraft.

SUMMARY OF THE INVENTION

Accordingly, an embodiment of the present invention is directed to a method for obtaining a localizer deviation and a glide slope deviation for an aircraft, including: directing electromagnetic signals from a weather radar system of an aircraft towards a runway; receiving return signals in response to the directed signals; based on the received return signals, determining an azimuth angle for the aircraft relative to the runway, determining an elevation angle for the aircraft relative to the runway, and determining a range for the aircraft relative to the runway; and based on the azimuth angle, the elevation angle, and the range, calculating the localizer deviation and the glide slope deviation for the aircraft.

An additional embodiment of the present invention is directed to a computer-readable medium having computer-executable instructions for performing a method for obtaining a localizer deviation and a glide slope deviation for an aircraft, said method including: directing electromagnetic signals from a weather radar system of an aircraft towards a threshold of a runway; receiving return signals in response to the directed signals; based on the received return signals, determining an azimuth angle for the aircraft relative to the threshold of the runway, determining an elevation angle for the aircraft relative to the threshold of the runway, and determining a range for the aircraft relative to the threshold of the runway; and based on the azimuth angle, the elevation angle, and the range, calculating the localizer deviation and the glide slope deviation for the aircraft.

A further embodiment of the present invention is directed to an on-board aircraft system for obtaining a localizer deviation and a glide slope deviation for the aircraft, including: a weather radar subsystem, the weather radar subsystem including: an antenna configured for directing electromagnetic signals from the weather radar subsystem of the aircraft towards a runway, the antenna further configured for receiving return signals in response to the directed signals; a memory communicatively coupled with the antenna, the memory configured for receiving return signal information based on the return signals, the memory further configured for storing the return signal information; and a processor communicatively coupled with the memory, the processor configured for retrieving the return signal information stored in the memory, the processor further configured for determining an azimuth angle for the aircraft relative to the runway, an elevation angle for the aircraft relative to the runway, and a range for the aircraft relative to the runway, the processor further configured for, based on the azimuth angle, the elevation angle, and the range, calculating the localizer deviation and the glide slope deviation for the aircraft.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

A number of airports are equipped with ground-based instrument approach systems known as Instrument Landing Systems (ILS) for providing precision guidance to aircraft which may be approaching the runways of said airports. Typically, the ILS may use radio signals for enabling a safe landing of an aircraft during Instrument Meteorological Conditions (IMC), such as low ceilings or reduced visibility due to fog, rain or blowing snow. Instrument Approach Procedure charts (or "approach plates") may be published for each ILS approach, providing pilots with the needed information to fly an ILS approach during Instrument Flight Rules (IFR) operations, including the radio frequencies used by the ILS components or the navaids and the minimum visibility requirements prescribed for the specific approach. However, the ground infrastructure (ex—localizer antenna array/transmitters and glideslope/glidepath antenna array/transmitters) of an Instrument Landing System (ILS) is often very expensive. Such expense may limit the number of airports which may be equipped with an ILS. Airports without an ILS may not be able to support low visibility operations. (ex—operations with minima at ILS Category I or less).

A currently available alternative to implementing an ILS, is GLS (GPS Landing System), which involves implementing a Global Positioning System (GPS) receiver and a database of runways. Further, the GPS receiver and the database of runways may be used to determine a position of an aircraft and to calculate artificial Localizer Deviations and artificial Glide Slope Deviations from the closest runway threshold. However, like ILS, a drawback to GLS is that it may be more expensive than desired.

In exemplary embodiments, the present invention provides system(s) and method(s) for synthesizing localizer and glide slope deviations from weather radar.

Figure 1:
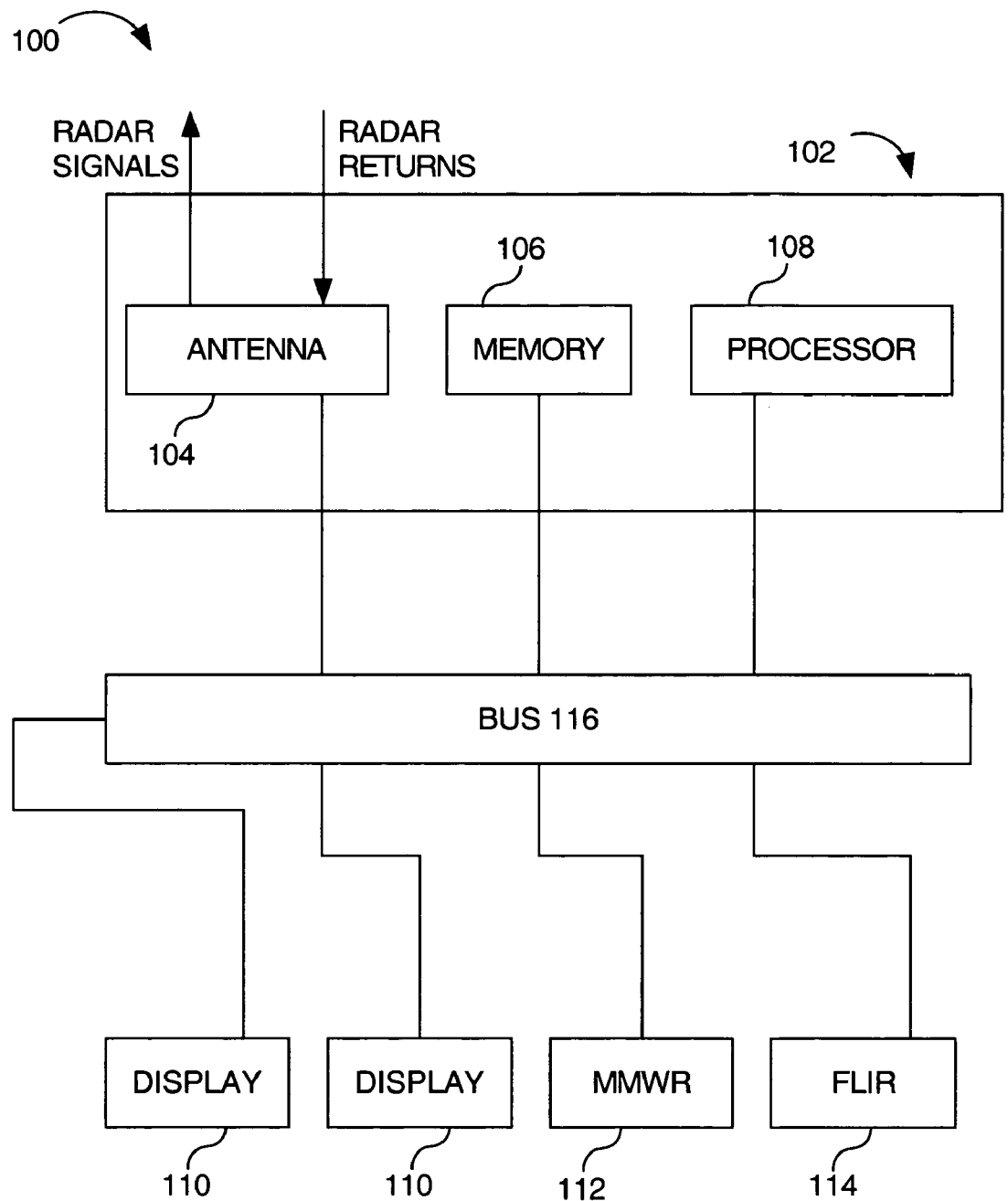
FIG. 1 is a block diagram schematic of an on-board aircraft system for obtaining a localizer deviation and a glide slope deviation for the aircraft in accordance with an exemplary embodiment of the present invention.

Referring to FIG. 1, an on-board aircraft system for obtaining a localizer deviation and a glide slope deviation for the aircraft in accordance with an exemplary embodiment of the present invention will be discussed. In the illustrated embodiment, the system 100 may include a weather radar system/weather radar subsystem 102, such as a WXR-700 system/subsystem, as produced by Rockwell Collins, Inc. of Cedar Rapids, Iowa. The weather radar system 102 may include an antenna 104 (ex.—transmitter/receiver). The antenna 104 may be configured for directing electromagnetic signals/electromagnetic signal transmissions from the weather radar system 102 of the aircraft towards a runway/runway threshold. The antenna 104 may be further configured for receiving return signals, said return signals being provided to the antenna 104 in response to the directed signals.

In exemplary embodiments, the weather radar system 102 may include a memory 106. The memory 106 may be communicatively coupled with the antenna 104. Further, the memory 106 may be configured for receiving return signals/return signal information based on the return signals (ex—return signal information may include return signals which have been amplified, etc.). The memory 106 may be further configured for storing the return signal information.

In current embodiments of the present invention, the weather radar system 102 may include a processor 108. The processor 108 may be communicatively coupled with the memory 106. Further, the processor 108 may be configured for retrieving the return signal information stored in the memory 106. In additional embodiments, the processor 108 may be further configured for determining an azimuth angle for the aircraft relative to the runway/runway threshold, an elevation angle for the aircraft relative to the runway/runway threshold, and a range for the aircraft relative to the runway/runway threshold. Still further, the processor 108 may be configured for, based on the azimuth angle, the elevation angle, and the range, calculating the localizer deviation and the glide slope deviation for the aircraft. For instance, the calculated glide slope deviation may be a deviation from a nominal 3 degree glide path for the aircraft.

In exemplary embodiments, the system 100 may include a display 110. The display 110 may be communicatively coupled with the processor 108. Further, the display 110 may be configured for receiving and displaying the calculated localizer deviation and the calculated glide slope deviation for the aircraft. For instance, the display may be an on-board display for the aircraft such as a Synthetic Vision System (SVS) display, or an Enhanced Vision System (EVS) display.

In current embodiments of the present invention, the processor 108 may be further configured for creating a runway location depiction/runway threshold location depiction. Further, the processor 108 may be configured for providing the runway location depiction/runway threshold location depiction to the display 110. In further embodiments, the runway location depiction/runway threshold location depiction may be created by the processor 108 based on the received return signals. Still further, the runway location depiction/runway threshold location depiction may include the azimuth angle, the elevation angle, the range, the localizer deviation, and the glide slope deviation.

In exemplary embodiments, the system 100 of the present invention may be configured for supporting low visibility operations for the aircraft. For example, low visibility operations may include operations having minima at Instrument Landing System (ILS) Category I, ILS Category II, or ILS Category IIIa. Further, the system 100 of the present invention may allow for low visibility operations for the aircraft to be supported at airports which are not equipped with ILS ground infrastructure (ex—airports which are not equipped with localizer transmitters or glide slope transmitters). For example, the system 100 may be useful for supporting low visibility operations for business jets which are operating at small airports which do not have ILS systems. Thus, the system 100 of the present invention may function as a sort of "synthetic" ILS system for supporting low visibility operations. Further, the system 100 of the present invention is configured for dynamically receiving return signals and for dynamically calculating/determining each of the following based on the dynamically received/updated return signals/return signal information: a.) for providing real time location information for an aircraft relative to a runway/runway threshold; and b) for providing a dynamically updated real-time runway depiction via a display of the aircraft: localizer deviation, glide slope deviation, an azimuth angle for the aircraft relative to the runway/runway threshold, an elevation angle for the aircraft relative to the runway/runway threshold, and a range for the aircraft relative to the runway/runway threshold.

In further embodiments, because it has no common modes of failure with a GLS (GPS Landing System), the system 100 of the present invention may be implemented with a GLS for supporting low visibility operations for the aircraft at airports which are not equipped with an ILS. The GLS may include a Global Positioning System (GPS) receiver and a database of runways, as described above. The GLS may be used in combination with the system 100 of the present invention to determine a position of an aircraft and to calculate artificial Localizer Deviations and artificial Glide Slope Deviations from the closest runway/runway threshold.

In additional embodiments, the system 100 may include/may be implemented with a millimeter wave radar (MMWR) system/subsystem 112 for the aircraft. The MMWR system 112 may be utilized in locating a runway/runway threshold and/or in creating a runway location depiction/runway threshold location depiction, such as in low visibility conditions/during low visibility operations. In still further embodiments, the system 100 of the present invention may include/may be implemented with a Forward Looking Infrared Radiation (FLIR) camera system 114 for the aircraft. The FLIR system 114 may be utilized in locating a runway/runway threshold and/or in creating a runway location depiction/runway threshold location depiction, such as in low visibility conditions/during low visibility operations. In still further embodiments, the system 100 may be configured for merging/fusing two or more of: the runway location depiction created by the weather radar system 102, the runway location depiction created by the MMWR system 112, and the runway location depiction created by the FLIR camera system 114 thereby creating a single runway location depiction (ex—collective runway location depiction) which includes/is based upon the merged runway location depictions. This single runway location depiction which includes/is based upon the merged runway location depictions may be provided to the display 110 and the display 110 may display the single runway location depiction which includes/is based upon the merged runway location depictions. In additional embodiments, the system 100 may include a bus 116 for communicatively coupling one or more of the antenna 104, the memory 106, the processor 108, the display 110, the MMWR system 112 and the FLIR camera system 114. In alternative embodiments, the system 100 may include multiple displays 110, such that the depiction(s) created by the weather radar system 102, the MMWR system 112, and the FLIR system 114 may be provided to separate displays 110 of the system 100.

Figure 2:
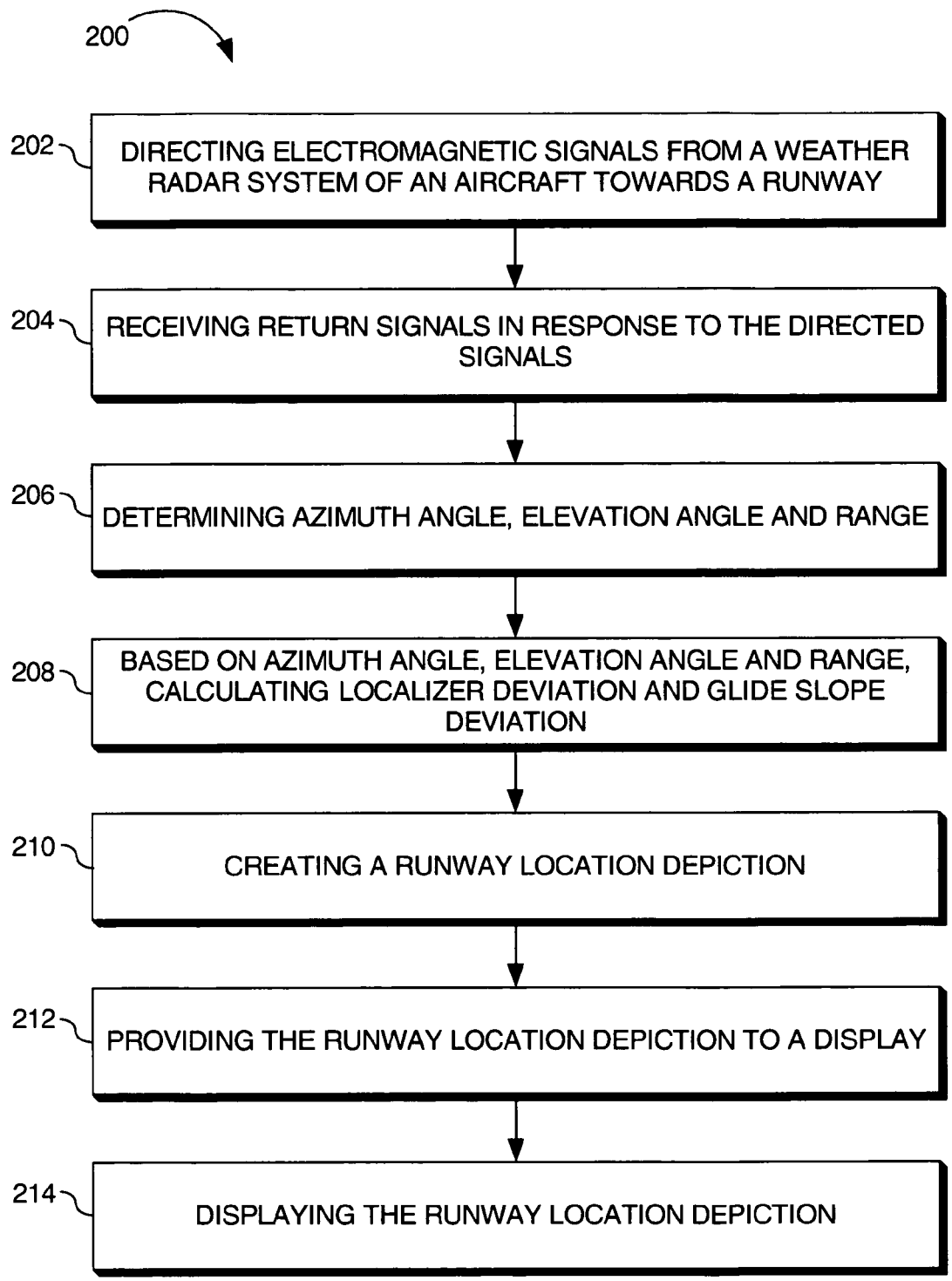
FIG. 2 is a flowchart illustrating a method for obtaining a localizer deviation and a glide slope deviation for an aircraft in accordance with an exemplary embodiment of the present invention.

FIG. 2 is a flowchart illustrating a method for obtaining a localizer deviation and a glide slope deviation for an aircraft in accordance with an exemplary embodiment of the present invention. The method 200 may include directing electromagnetic signals from a weather radar system of an aircraft towards a runway/runway threshold 202. The method 200 may further include receiving return signals in response to the directed signals 204. The method 200 may further include, based on the received return signals, determining an azimuth angle for the aircraft relative to the runway/runway threshold, determining an elevation angle for the aircraft relative to the runway/runway threshold, and determining a range for the aircraft relative to the runway/runway threshold 206. The method 200 may further include, based on the azimuth angle, the elevation angle, and the range, calculating the localizer deviation and the glide slope deviation for the aircraft 208.

In additional embodiments, the method 200 may further include creating a runway location depiction/runway threshold location depiction based on the received return signals, the runway location depiction/runway threshold location depiction including the azimuth angle, the elevation angle, the range, the localizer deviation and the glide slope deviation 210. The method 200 may further include providing the runway location depiction/runway threshold location depiction to a display 212. For instance, the display may be an on-board display, such as a Synthetic Vision System (SVS) display, or an Enhanced Vision System (EVS) display. The method 200 may further include displaying the runway location depiction/runway threshold location depiction via the display 214.

In alternative exemplary embodiments in which the system 100 includes or is implemented with a MMWR system, the method 200 may further include directing electromagnetic signals from a millimeter wave radar (MMWR) system of the aircraft towards the runway/runway threshold 216. Additionally, the method 200 may further include receiving millimeter wave radar return signals in response to the signals directed from the millimeter wave radar system 218. In further embodiments, the method 200 may further include creating a runway location depiction/runway threshold location depiction based on the received millimeter wave radar return signals 220. In additional embodiments, the method 200 may further include providing the runway location depiction/runway threshold location depiction which is based on the received millimeter wave radar return signals to a display 222 and displaying the runway location depiction/runway threshold location depiction via the display 224.

In additional alternative exemplary embodiments in which the system 100 includes or is implemented with an FLIR camera system, the method 200 may further include receiving Infrared (IR) radiation via a Forward Looking Infrared Radiation (FLIR) camera system of the aircraft 226. The method 200 may further include, based on the received IR radiation, creating a runway location depiction/runway threshold location depiction 228. The method 200 may further include providing the runway location depiction/runway threshold location depiction to a display 230. The method 200 may further include displaying the runway location depiction/runway threshold location depiction via the display 232.

In still further alternative exemplary embodiments of the present invention, as discussed above, the system 100 may include/may be implemented with the weather radar system 102, the MMWR system 112, and the FLIR system 114. In such embodiments, a method 300 for obtaining a localizer deviation and a glide slope deviation for an aircraft in accordance with an alternative exemplary embodiment of the present invention may include: directing electromagnetic signals from a weather radar system of an aircraft towards a runway 302; receiving return signals in response to the directed signals 304; based on the received return signals, determining an azimuth angle for the aircraft relative to the runway, determining an elevation angle for the aircraft relative to the runway, and determining a range for the aircraft relative to the runway 306; based on the azimuth angle, the elevation angle, and the range, calculating the localizer deviation and the glide slope deviation for the aircraft 308; creating a first runway location depiction, the first runway location depiction being based on the received return signals, the first runway location depiction including the azimuth angle, the elevation angle, the range, the localizer deviation and the glide slope deviation 310; directing electromagnetic signals from a millimeter wave radar system of the aircraft towards the runway 312; receiving millimeter wave radar return signals in response to the signals directed from the millimeter wave radar system 314; based on the received millimeter wave radar return signals, creating a second runway location depiction 316; receiving Infrared (IR) radiation via a Forward Looking Infrared Radiation (FLIR) camera system of the aircraft 318; based on the received IR radiation, creating a third runway location depiction 320; merging the first, second and third runway depictions to create a collective runway depiction 322; providing the collective runway location depiction to an on-board display 324; and displaying the collective runway location depiction via the display 326.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for obtaining a localizer deviation and a glide slope deviation for an aircraft, comprising:
   directing electromagnetic signals from a weather radar system of an aircraft towards a runway;
   receiving return signals in response to the directed signals;
   based on the received return signals, determining an azimuth angle for the aircraft relative to the runway, determining an elevation angle for the aircraft relative to the runway, and determining a range for the aircraft relative to the runway; and
   based on the azimuth angle, the elevation angle, and the range, calculating the localizer deviation and the glide slope deviation for the aircraft.

2. A method as claimed in claim 1, further comprising:
   creating a runway location depiction based on the received return signals, the runway location depiction including the azimuth angle, the elevation angle, the range, the localizer deviation and the glide slope deviation.

3. A method as claimed in claim 2, further comprising:
   providing the runway location depiction to an on-board display.

4. A method as claimed in claim 3, further comprising:
   displaying the runway location depiction via the on-board display.

5. A method as claimed in claim 4, wherein the display is one of a Synthetic Vision System (SVS) display, or an Enhanced Vision System (EVS) display.

6. A method as claimed in claim 1, further comprising:
   directing electromagnetic signals from a millimeter wave radar system of the aircraft towards the runway.

7. A method as claimed in claim 6, further comprising:
   receiving millimeter wave radar return signals in response to the signals directed from the millimeter wave radar system.

8. A method as claimed in claim 7, further comprising:
   based on the received millimeter wave radar return signals, creating a runway location depiction.

9. A method as claimed in claim 8, further comprising:
   providing the runway location depiction to an on-board display; and
   displaying the runway location depiction via the on-board display.

10. A method as claimed in claim 1, further comprising:
    receiving Infrared (IR) radiation via a Forward Looking Infrared Radiation (FLIR) camera system of the aircraft.

11. A method as claimed in claim 10, further comprising:
    based on the received IR radiation, creating a runway location depiction.

12. A method as claimed in claim 11, further comprising:
    providing the runway location depiction to an on-board display; and
    displaying the runway location depiction via the on-board display.

13. A method as claimed in claim 1, further comprising:
    creating a first runway location depiction, the first runway location depiction being based on the received return signals, the first runway location depiction including the azimuth angle, the elevation angle, the range, the localizer deviation and the glide slope deviation;
    directing electromagnetic signals from a millimeter wave radar system of the aircraft towards the runway;
    receiving millimeter wave radar return signals in response to the signals directed from the millimeter wave radar system;
    based on the received millimeter wave radar return signals, creating a second runway location depiction;
    receiving Infrared (IR) radiation via a Forward Looking Infrared Radiation (FLIR) camera system of the aircraft;
    based on the received IR radiation, creating a third runway location depiction;
    merging the first, second and third runway depictions to create a collective runway depiction;
    providing the collective runway location depiction to an on-board display; and
    displaying the collective runway location depiction via the display.

14. A computer-readable medium having computer-executable instructions for performing a method for obtaining a localizer deviation and a glide slope deviation for an aircraft, said method comprising:
    directing electromagnetic signals from a weather radar system of an aircraft towards a threshold of a runway;
    receiving return signals in response to the directed signals;
    based on the received return signals, determining an azimuth angle for the aircraft relative to the threshold of the runway, determining an elevation angle for the aircraft relative to the threshold of the runway, and determining a range for the aircraft relative to the threshold of the runway; and
    based on the azimuth angle, the elevation angle, and the range, calculating the localizer deviation and the glide slope deviation for the aircraft.

15. A computer-readable medium as claimed in claim 14, said method further comprising:
    creating a runway threshold location depiction based on the received return signals, the runway threshold location depiction including the azimuth angle, the elevation angle, the range, the localizer deviation and the glide slope deviation.

16. A method as claimed in claim 15, further comprising:
    providing the runway threshold location depiction to an on-board display.

17. A method as claimed in claim 16, further comprising:
    displaying the runway threshold location depiction via the on-board display.

18. A method as claimed in claim 17, wherein the display is one of a Synthetic Vision System (SVS) display, or an Enhanced Vision System (EVS) display.

19. An on-board aircraft system for obtaining a localizer deviation and a glide slope deviation for the aircraft, comprising:
    a weather radar subsystem, the weather radar subsystem including:
        an antenna configured for directing electromagnetic signals from the weather radar subsystem of the aircraft towards a runway, the antenna further configured for receiving return signals in response to the directed signals;
        a memory communicatively coupled with the antenna, the memory configured for receiving return signal information based on the return signals, the memory further configured for storing the return signal information; and
        a processor communicatively coupled with the memory, the processor configured for retrieving the return signal information stored in the memory, the processor further configured for determining an azimuth angle for the aircraft relative to the runway, an elevation angle for the aircraft relative to the runway, and a range for the aircraft relative to the runway, the processor further configured for, based on the azimuth angle, the elevation angle, and the range, calculating the localizer deviation and the glide slope deviation for the aircraft.

20. A system as claimed in claim 19, further comprising:
a display communicatively coupled with the processor, the display configured for receiving and displaying the calculated localizer deviation and glide slope deviation for the aircraft.

21. A system as claimed in claim 20, wherein the processor is further configured for creating a runway location depiction and providing the runway location depiction to the display, the runway location depiction being created based on the received return signals, the runway location depiction including the azimuth angle, the elevation angle, the range, the localizer deviation and the glide slope deviation.

22. A system as claimed in claim 21, wherein the system is configured for supporting low visibility operations for the aircraft, including operations with minima at Instrument Landing System (ILS) Category I, ILS Category II, or ILS Category IIIa.

* * * * *